S. J. KEIM.
Planter, Cultivator and Fertilizer Distributer.

No. 208,824. Patented Oct. 8, 1878.

Witnesses.
John F. Grant.
D. Louis Shivers.

Inventor.
Simon J. Keim
per Edw Brown
attorney.

2 Sheets—Sheet 2.

S. J. KEIM.
Planter, Cultivator and Fertilizer Distributer.

No. 208,824.  Patented Oct. 8, 1878.

Witnesses.
John F. Grant
D. Louis Shivers

Inventor.
Simon J. Keim
per Edw Brown
attorney

UNITED STATES PATENT OFFICE.

SIMON J. KEIM, OF CATASAUQUA, PENNSYLVANIA, ASSIGNOR OF ONE-HALF HIS RIGHT TO WILLIAM YOUNGER, OF SAME PLACE.

IMPROVEMENT IN PLANTER, CULTIVATOR, AND FERTILIZER-DISTRIBUTER.

Specification forming part of Letters Patent No. 208,824, dated October 8, 1878; application filed February 26, 1878.

*To all whom it may concern:*

Be it known that I, SIMON J. KEIM, of Catasauqua, Pennsylvania, have invented a new and useful Improvement in Planter, Cultivator, and Fertilizer-Distributer Combined, which improvement is fully set forth in the following specification and accompanying drawings, in which—

Figure 1:
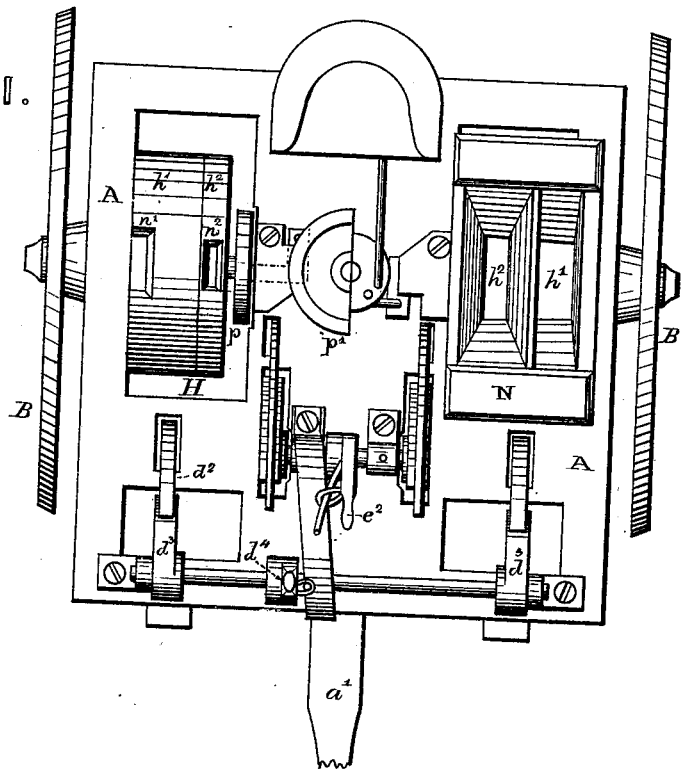
Figure 2:
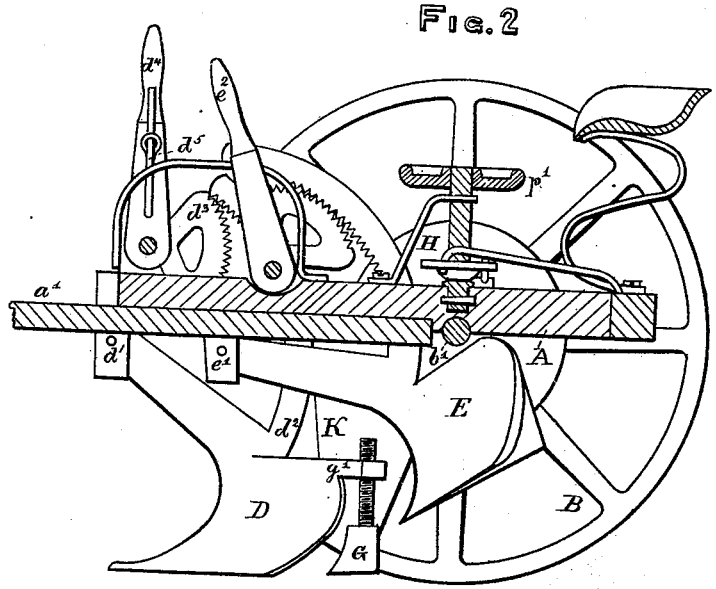
Figure 3:
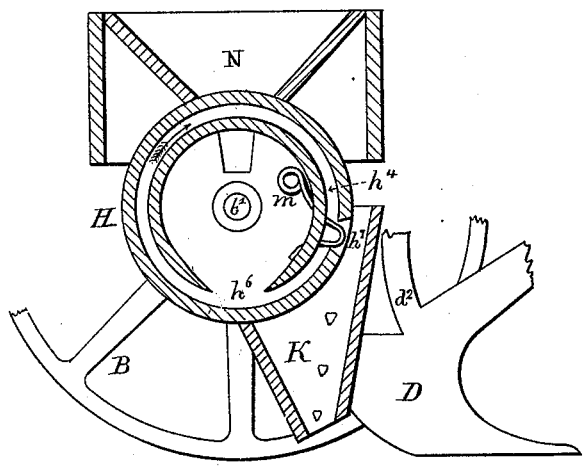
Figure 4:
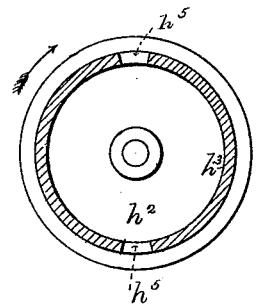
Figure 5:
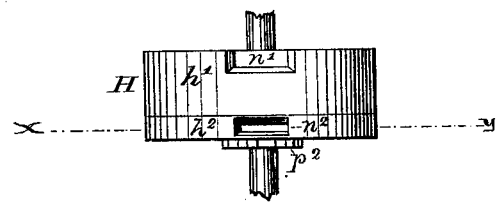
Figure 6:
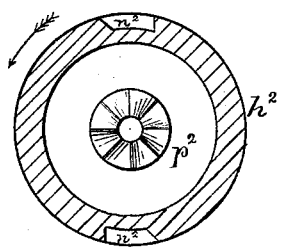

Figure 1 is a plan of the machine. Fig. 2 is a sectional elevation. Fig. 3 is a vertical section, showing one side of the seed-dropper. Fig. 4 is a similar view of the opposite side. Fig. 5 is a plan of the seed-dropper. Fig. 6 is a section through fertilizer-cup on the line $x\,y$.

The object of my invention consists in the construction of a corn-planter upon a frame with wheels. The seed-dropper is large enough to hold the corn to be planted; and it consists of one fixed and one movable disk, turned by the axle. This dropper, by means of a recess in its exterior, distributes a fertilizer along with the seed planted. By means of an expelling-spring the seed-cup is kept free and in working order. Plows are suspended beneath the frame, which are raised or lowered by levers working in toothed arms. Cultivators also are suspended beneath the frame, and raised in a similar manner.

In the drawings, A is the frame, having a pole, $a'$, to which the horses are attached; B, the wheels, carrying the whole machine. These wheels are fast to the axle $b^1$, which passes through the center of the seed-dropper H.

D is a plow, hinged to the frame at $d^1$. The other end is supported by a toothed arc, $d^2$, which gears into a segment, $d^3$. This segment is moved by the lever $d^4$. A catch, $d^5$, secures the lever in any desired position.

A small V-shaped shovel, G, which can be raised and lowered, is fastened to an arm, $g^1$, on each wing of the plow. They are behind the termination of the mold-boards, and are wider apart, for the purpose of throwing the soil over the seed in wet ground. Two other plows or cultivators, E, are placed between the aforesaid ones, D, and to the rear. They are hinged at $e^1$, and raised by lever $e^2$ in a similar manner to the plows D. These cultivators E are not used when the seed-dropper and plows D are in use.

In the machine shown there are two seed-droppers, H, arranged in combination with the plows D, to plant two rows of corn at once. The seed-dropper is made in two parts. One part, $h^1$, is stationary; the other, $h^2$, (see Figs. 3, 4, 5, and 6,) turns when thrown into gear with the axle. The disk $h^2$ has on its inside a circular ring, $h^3$, which fits into a groove, $h^4$, in the part $h^1$. In this ring are two circular holes, $h^5$, of the proper size, in which to drop the requisite number of grains of corn. At the bottom of the inner ring of the disk $h^1$ there is a break in its continuity at $h^6$, through which the seed can fall and fill the cup $h^5$. The cup $h^5$ is carried around, as per the arrow, until it arrives at the opening $h^7$, where the seed will fall out and down the spout K, and is deposited at regular intervals behind the plow D, and the soil immediately covers it.

To prevent any of the kernels sticking in the cup $h^5$, I secure a spring, $m$, which works through a narrow slit in the inner ring of disk $h^1$, and as soon as the seed-cup $h^5$ comes opposite the delivery-opening the spring $m$ is forced through the cup, throwing all the seed into the spout. Upon the outer surface of the disk $h^2$, and immediately over the holes $h^5$, is a sunken recess or cup, $n^2$, for the deposit of a fertilizer or the planting of potatoes.

The seed-dropper H is fed from a hopper, N, divided into two parts, one of which contains the seed, which falls down the opening $n^1$, and fills the inside of the dropper. The other side contains the fertilizer, which fills the cup $n^2$, and is carried around and falls into the ground along with the seed. The size of the cup $n^2$ can be adjusted so as to hold one or a part of one potato. The hopper is then filled with potatoes, which can be planted by the machine equally as well as corn or other seed.

The disk $h^2$ is thrown in and out of gear by the clutch $p$ and wheel $p^1$, operating upon the ratchet-wheel $p^2$. (See Fig. 5.)

I claim—

1. The disk $h^1$, provided with the opening $h^7$, and having an inner concentric flange or ring, provided with the brake $h^6$ and an expelling device, combined with the disk $h^2$, having the opening $h^5$, and provided with the flange $h^3$, adapted to fit within the groove $h^4$ of the disk $h^1$, substantially as specified.

2. The seed-dropper H, consisting of the stationary disk $h^1$, the rotary disk $h^2$, and the internal ring $h^3$, fitting into the groove $h^4$, and having an opening, $h^5$, which forms a seed-pocket to receive a fixed amount of seed through opening $h^6$, and which seed is carried around within the groove $h^4$, and is deposited from the opening $h^7$, as herein described.

3. The combination of the stationary disk $h^1$, the rotary disk $h^2$, having a seed-pocket, $h^5$, and a fertilizer-cup, $n^2$, by which a fertilizer is deposited simultaneously with the seed in the spout K.

SIMON J. KEIM.

Witnesses:
 R. AUG. DONELY,
 WM. HAMERSLEY.